April 8, 1941.                F. W. SCHWINN                2,237,581
                         BRAKE LEVER FOR BICYCLES
                           Filed March 6, 1940
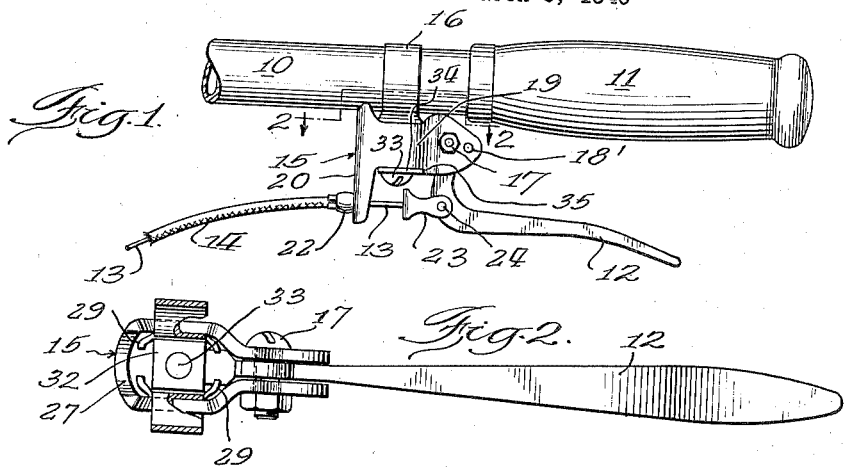
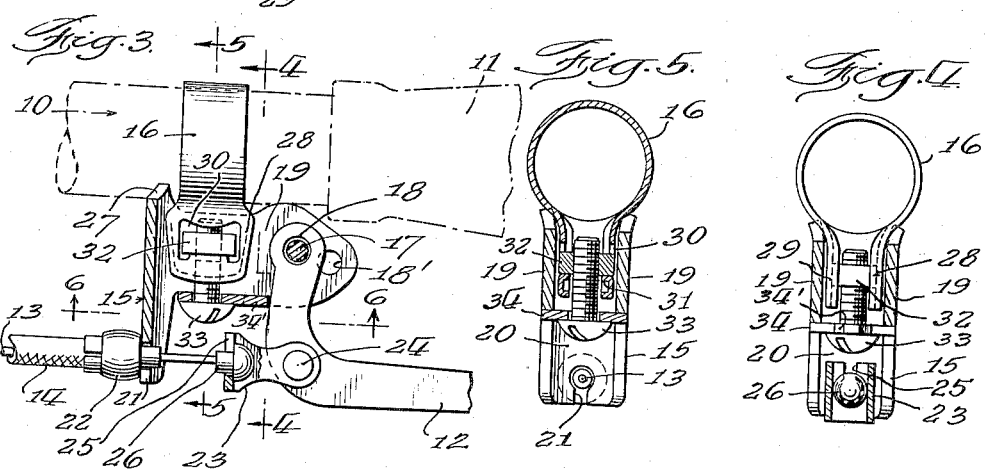
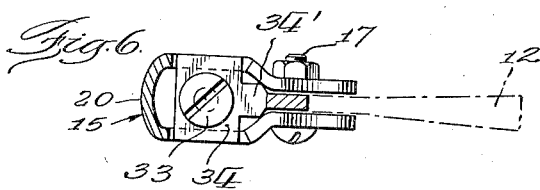
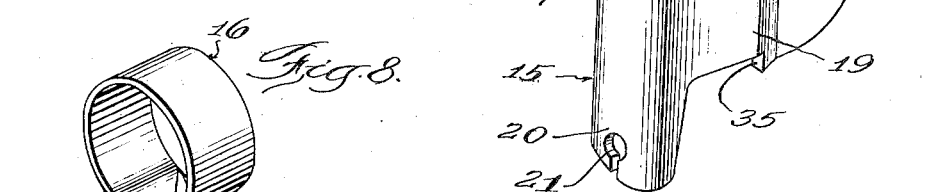
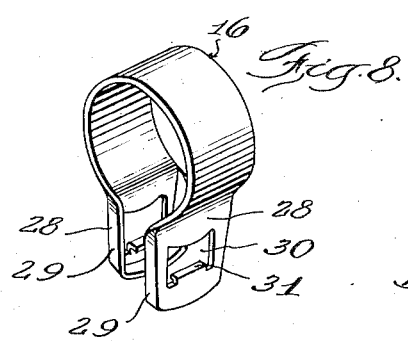
Inventor:
Frank W. Schwinn
By Williams, Bradbury,
McCaleb & Hinkle
Attys Patented Apr. 8, 1941

2,237,581

UNITED STATES PATENT OFFICE 2,237,581

BRAKE LEVER FOR BICYCLES

Frank W. Schwinn, Chicago, Ill.

Application March 6, 1940, Serial No. 322,442

1 Claim. (Cl. 74—489)

My invention relates to brake levers for bicycles and the like, and is particularly concerned with the mounting, upon a handle bar, of a brake lever which operates a Bowden wire, for example, to actuate a bicycle brake. I contemplate, however, that the lever and my mounting, whereby it is attached to a handle bar, may be employed for the control of speed changers as well as brakes.

One object of my invention is a simplified and more economical mounting for the brake lever upon a handle bar, a mounting which is simple in construction and application, which holds the lever mounted in the desired position against slipping along or about the handle bar, and which, to a large extent, utilizes standard parts, such as standard nuts and bolts.

The foregoing, together with further objects, features and advantages of my invention, are set forth in the following description of a specific embodiment thereof and illustrated in the accompanying drawing, wherein:

Fig. 1 is a side elevation of a bicycle handle bar equipped with a brake lever mounted according to my invention;

Fig. 2 is a plan section taken on the line 2—2 of Fig. 1;

Fig. 3 is a side view, similar to Fig. 1, but on an enlarged scale and with some of the parts broken into medial longitudinal vertical section;

Fig. 4 is a transverse vertical section, taken on the line 4—4 of Fig. 3;

Fig. 5 is a transverse vertical section, taken on the line 5—5 of Fig. 3;

Fig. 6 is a horizontal section, taken on the line 6—6 of Fig. 3 and looking upwardly;

Fig. 7 is a perspective detail of the mounting body; and

Fig. 8 is a perspective detail of the mounting stirrup which encircles the handle bar.

In Fig. 1 I have shown the end of a bicycle handle bar 10 terminating in a grip 11 and pivotally mounting a finger lever 12 which, upon being pulled upwardly toward the grip, pulls the Bowden wire 13 in a Bowden tube 14 to actuate the brake. The lever 12 as well as the end of the Bowden tube 14 are mounted on a mounting body 15, which is attached to the underside of the handle bar by means of a stirrup 16.

The lever 12 is L-shaped, with its long arm extending beneath and normally more or less parallel with the handle bar grip. The short arm of the lever is turned upwardly, and a pivot bolt 17 passes through the end of the short arm of the lever and also through aligned pivot holes 18 in the parallel legs 19 of the U-shaped body 15.

The forward or webbed portion of the body 15 depends, as shown at 20, and carries a keyhole-shaped notch 21 extending inwardly from its bottom edge. The notch 21 receives a fitting 22 on the end of the Bowden tube 14, whereby the latter is anchored to the mounting body.

A short link 23 is pivoted at 24 to the lever at the junction of its short and long arms. The link is U-shaped in plan and its forward web carries a keyhole-shaped notch 25, in which is received the head-like fitting 26 on the end of the Bowden wire 13.

Thus, while the rider's hand rests on the handle bar grip 11, his fingers may reach down and pull the long arm of the lever 12 upwardly, swinging it about the pivot bolt 17 and pulling the link 23 forwardly, which pulls the wire 13 forwardly in a direction fairly parallel with the direction of the end of the Bowden tube as it is mounted on the body 15. It will be understood that when the brake is to be released, the rider permits the lever 12 to swing downwardly under the pressure of the usual return spring provided on the brake, but not illustrated in the drawing.

For some installations, and where a different amplitude of movement for the lever is desired, the pivot bolt 17 may be removed by unscrewing its nut and may be placed in the alternate pivot holes 18'.

The mounting body 15 is, in turn, mounted rigidly upon the handle bar 10, preferably on its bottom side, by means of the previously mentioned stirrup 16. The upper edge of the forward web portion of the body 15 rests against the cylindrical surface of the handle bar and is arcuately conformed, as indicated at 27, in Fig. 7, for that purpose. The upper edges of the legs 19 of the mounting body, toward their forward ends, also make laterally spaced contact with the cylindrical surface of the handle bar. The mounting body 15 is urged radially and tightly against the handle bar by the stirrup 16.

The stirrup 16, like the mounting body 15, may be stamped from sheet metal. The stirrup 16 is in the form of a C-shaped ring, terminating in generally parallel spaced legs 28. The legs 28 are reinforced by inturned marginal flanges 29 along their front, back and bottom edges. An opening 30 is stamped into each leg 28 in such a manner as to leave an inwardly extending ledge 31 at the bottom of each opening 30.

A horizontally disposed nut 32 is positioned between the legs 28. At least one of the openings 30 is of a width and heighth sufficient to permit the lateral insertion of the nut therethrough.

The legs 28, with the nut held therein, are inserted downwardly between the legs 19 of the mounting body, with which they make a snug fit. The width of the nut is but slightly less than the space between the legs 19 of the mounting body, and thus they hold the nut against lateral movement in the openings 30, but with the lateral edges of the nut within the planes of the sheet metal of the stirrup legs 28. The top and bottom edges of the openings 30 likewise hold the nut against vertical movement relative to the stirrup, and at the bottom of the openings 30 this is further insured by the ledges 31.

An upwardly extending cap screw 33 is threaded into the nut to draw the mounting body 15 upwardly against the handle bar. In order that the head of the screw may have a purchase on the mounting body, a square washer 34 is used. The washer 34, near its lateral edges, rests against the bottom edges of the legs 19 of the mounting body in notch-like seats 35 provided therein. The head of the screw comes below the square washer 34, and the shank of the screw extends through an opening in the washer. Tightening the screw pulls the clamp downwardly and the mounting body upwardly with great pressure, whereby rigidly to lock the stirrup and mounting body upon the handle bar. The nut is precluded from turning by its fit in the legs of the stirrup and by the fit of its lateral faces against the legs 19 of the mounting body. The downward pull, which the nut exerts against the stirrup, is borne by the inturned ledges 31, which preclude the nut's tearing through the ends of the stirrup legs, and this is further precluded by the reinforcing flanges 29 of the stirrup legs.

A lip 34' extends forwardly from the washer 34, as shown in Fig. 6, and bears against the inner surfaces of the converging portions of the legs 19 of the mounting body, where they come closer together for receiving the end of the lever 12 between them.

The lip 34', as best shown in Fig. 3, also acts as a limiting stop for downward swinging of the lever.

My lever mounting, it will be seen, is very simple in design and construction, it may inexpensively be made largely from stampings, it employs a standard nut and screw for tightening, and yet it has the strength to permit a very tight locking of the mounting upon the handle bar whereby to prevent the mounting from shifting along the handle bar or turning about it.

I claim:

A mounting for the handle of a brake lever or the like upon a handle bar, comprising a U-shaped body having a forward web and rearwardly extending legs, a pivot extending between the legs near their rearward ends for pivotally mounting the lever therebetween, means near the bottom of the webbed portion for mounting the end of a Bowden tube, the wire of which is connected to the lever, the upper end of the body being curved to press against the handle bar, a stirrup for encircling the handle bar and having spaced legs extending into the body between its legs and intermediate its forward web and said pivot, the legs of said stirrup being formed with aligned slots for receiving a nut, the metal at the lower edge of each slot being inturned to form a ledge upon which said nut rests, an upwardly extending screw threaded into the nut, a generally rectangular washer through which the shank of the screw passes, the bottom edges of the rearwardly extending legs of the U-shaped body being formed with shoulders with which said rectangular washer engages to prevent its rotation, said washer affording purchase for the head of the screw whereby, when the screw is threaded into the nut, the stirrup is pulled into the mounting body and the mounting body is pulled against the side of the handle bar.

FRANK W. SCHWINN.